(12) United States Patent
Abraham et al.

(10) Patent No.: US 6,446,987 B2
(45) Date of Patent: *Sep. 10, 2002

(54) ROLLER MECHANISM FOR CONTAINER OR CART

(75) Inventors: J Richard Abraham, Fox Chapel Borough, PA (US); Paolo M. B. Tiramani; John A. Bozak, both of Greenwich, CT (US)

(73) Assignee: 500 Group, Inc., Greenwich, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/441,173

(22) Filed: Nov. 15, 1999

Related U.S. Application Data

(63) Continuation of application No. 08/668,442, filed on Jun. 19, 1996, now Pat. No. 5,984,326.

(51) Int. Cl.[7] .................................................. B62B 3/02
(52) U.S. Cl. ..................... 280/47.2; 280/38; 280/47.26; 190/18 A
(58) Field of Search ........................... 280/8, 9, 38, 37, 280/641, 651, 654, 655, 47.17, 47.18, 47.19, 47.2, 47.26, 47.34, DIG. 6; 190/18 A (56) References Cited

U.S. PATENT DOCUMENTS

| 627,284 A | 6/1899 | Walker ....................... 280/47.2 |
| 1,005,063 A | 10/1911 | Nordstrom et al. ............ 280/46 |
| 1,203,194 A | * 10/1916 | Haege ......................... 280/641 |
| 1,808,864 A | 6/1931 | Pinheiro ..................... 190/18 A |

(List continued on next page.)

FOREIGN PATENT DOCUMENTS

| CA | 1026788 | * | 2/1978 | .............. 280/47.18 |
| EP | 0187318 A | | 7/1986 | |
| GB | 665742 A | | 1/1952 | |
| GB | 2043547 | | 10/1980 | |
| GB | 2135638 A | | 9/1984 | |
| GB | 2168035 A | | 6/1986 | |
| GB | 2245543 A | | 1/1992 | |
| TW | 42494 | | 3/1982 | |
| TW | 249908 | | 6/1995 | |
| TW | 272397 | | 3/1996 | |

OTHER PUBLICATIONS

Advertisement, "Remin Kart–A–Bag Carts", *Showcase Magazine*, Feb./Mar. 1995, p. 50, vol. 20, No. 1, Luggage & Leather Goods Manufacturers of America.

(List continued on next page.)

*Primary Examiner*—Frank Vanamah
(74) *Attorney, Agent, or Firm*—Kirk D. Houser; Eckert Seamans Cherin & Mellott, LLC (57) ABSTRACT

A suitcase has first rollers mounted thereon to at least partially support the suitcase when in an upright position and to enable rolling movement of the suitcase across a surface. The first end of an arm is pivotally mounted to a rigid body portion of the suitcase. Second rollers are mounted about adjacent to the second end of the arm to enable rolling movement of the suitcase across the surface. A first link is pivotally mounted to the rigid body portion, and a second link is pivotally mounted to the first link and the arm. The arm is alternately retractable to a retracted position about adjacent to a rear panel of the suitcase, and deployable to a deployed position spaced outwardly from the rear panel. The first and second rollers cooperate to fully support the suitcase when the second rollers are deployed and the suitcase is in a rolling position. A push/pull handle is mounted on the suitcase to enable a user to roll the suitcase across the surface.

9 Claims, 6 Drawing Sheets

U.S. PATENT DOCUMENTS

| | | | |
|---|---|---|---|
| 1,895,677 A | 1/1933 | Pinheiro | 190/18 A |
| 2,034,472 A | 3/1936 | Kesslinger | 190/18 A |
| 2,438,596 A | 3/1948 | Arave et al. | 280/8 |
| 2,581,417 A | 1/1952 | Jones | 280/38 |
| 3,411,798 A * | 11/1968 | Capadalis | 280/47.17 |
| 3,559,778 A | 2/1971 | D'Elia et al. | 190/49 |
| 3,655,212 A | 4/1972 | Krass et al. | 280/641 |
| 3,850,441 A | 11/1974 | Peters et al. | 280/47.2 |
| 3,861,704 A | 1/1975 | De White | 280/47.34 |
| 3,873,118 A | 3/1975 | Takagi | 280/47.2 |
| 3,960,252 A | 6/1976 | Cassimally | 190/18 A |
| 4,087,102 A | 5/1978 | Sprague | 280/37 |
| 4,254,850 A | 3/1981 | Knowles | 190/18 A |
| 4,273,222 A | 6/1981 | Cassimally et al. | 190/18 A |
| 4,284,286 A | 8/1981 | Lewallen | 280/47.2 |
| 4,411,343 A | 10/1983 | Cassimally et al. | 190/18 A |
| 4,433,760 A | 2/1984 | Pelavin | 190/115 |
| 4,575,109 A | 3/1986 | Cowdery | 280/37 |
| 4,588,055 A | 5/1986 | Chen | 190/18 A |
| 4,630,837 A | 12/1986 | Kazmark | 280/47.2 |
| 4,792,025 A | 12/1988 | Thomas | 190/18 A |
| 4,867,438 A * | 9/1989 | Steckert et al. | 280/47.2 |
| 4,896,897 A | 1/1990 | Wilhelm | 280/655 |
| 4,979,598 A | 12/1990 | Verheij et al. | 190/18 A |
| 4,995,487 A | 2/1991 | Plath | 190/18 A |
| 5,096,265 A | 3/1992 | Chang | 301/111 |
| 5,114,164 A | 5/1992 | Bothwell et al. | 280/37 |
| 5,154,265 A | 10/1992 | Capistrant | 190/18 A |
| 5,181,590 A * | 1/1993 | Carpenter et al. | 190/18 A |
| 5,207,439 A | 5/1993 | Mortenson | 280/47.2 |
| 5,407,039 A | 4/1995 | Alper et al. | 190/18 A |
| D364,022 S | 11/1995 | Kazmark, Jr. | D34/26 |
| 5,474,162 A | 12/1995 | Shyr et al. | 190/18 A |
| 5,482,147 A | 1/1996 | Wang | 190/115 |
| 5,519,919 A | 5/1996 | Lee | 16/115 |
| 5,522,487 A | 6/1996 | Nordstrom | 190/18 A |
| 5,524,737 A | 6/1996 | Wang | 190/18 A |
| 5,568,848 A | 10/1996 | Liang | 190/18 A |
| 5,630,521 A | 5/1997 | Waddell et al. | 190/18 A |
| 5,658,118 A | 8/1997 | Luca | 280/47.2 |
| 5,671,842 A | 9/1997 | Jaworski | 280/DIG. 6 |
| 5,730,452 A | 3/1998 | Fields | 280/47.19 |
| 5,779,251 A | 7/1998 | Meier | 280/47.2 |
| 5,873,439 A * | 2/1999 | Liang | 190/18 A |
| 5,941,543 A | 8/1999 | Kazmark, Jr. | 280/47.29 |
| 6,016,893 A * | 1/2000 | Chen et al. | 190/18 A |

OTHER PUBLICATIONS

Jones, Del, et al., "A Quick Read on Trends Affecting Business Travelers", *USA Today*, Mar. 7, 1995, p. 9B.

Advertisement, "Atlantic Products' 4x4 Four Wheel Drive", *Showcase Magazine*, Apr./May 1995, p. 79, vol. 20, No. 2, Luggage & Leather Goods Manufacturers of America.

Article, "Atlantic Introduces 4x4 Four Wheel Drive", *Showcase Magazine*, Apr./May 1995, p. 164, vol. 20, No. 2, Luggage & Leather Goods Manufacturers of America.

Advertisement, "The World's Greatest™ Uprights* ", 1996, 1 p., Samsonite Corporation.

Advertisement, "TransPorter™ —The First Suitcase You Can Push", 1996, 2 pp., American Tourister.

* cited by examiner

ROLLER MECHANISM FOR CONTAINER OR CART

This application is a continuation of Ser. No. 08/668,442 filed Jun. 19, 1996 now U.S. Pat. No. 5,984,326.

FIELD OF THE INVENTION

This invention relates to a container or cart equipped for rolling movement over a surface, and, more particularly, to a suitcase having retractable rollers.

BACKGROUND INFORMATION

It has become popular to mount suitcases on rollers to enable them to be rolled across a surface, such as the ground or a floor. Such suitcases are typically provided with a handle to enable the user to pull or push the case on the rollers.

One popular style of wheeled suitcase includes rollers or wheels mounted on the rear portion of the bottom of the case. The handle is mounted on the top of the rear portion of the case. When at rest, the case rests on the wheels and one or more legs. The user grips the handle and tilts the suitcase to an inclined position in order that the weight of the case is supported by the wheels and by the user's force on the handle. The case is then rolled across the surface. That type of configuration enables superior control over maneuvering of the case.

One disadvantage of that type of rolling suitcase is that when it is being pulled, at least a portion of the weight of the suitcase must be supported by the user. Another disadvantage is that luggage with two or four fixed wheels must be picked up by the user in order to negotiate a relatively large step. A two wheel dolly, for example, needs to be dragged up the step backwards, which may scratch the step.

A cart having four fixed wheels, such as a trolley or shopping cart, effectively bears the total load of all contents with the user providing sufficient force to overcome rolling resistance. Disadvantages are that carts are generally relatively heavy, and do not collapse or otherwise compact to a smaller size.

Application Ser. No. 08/397,687 discloses another type of rolling suitcase in which a first pair of rollers is mounted at the junction of a rear panel and the bottom of a wall member of the suitcase. This first pair of rollers is mounted to support at least a portion of the weight of the suitcase when in the upright, or at-rest, position. A single, relatively narrow bracket is hingedly attached to a rigid portion of the rear panel. A support stay is mounted between the bracket and the rear panel to enable deployment and retraction of a second pair of rollers which is located on the bracket. The support stay may be hingedly secured to the rear panel or to the bracket. A plurality of stops may be provided to enable the deployment of the second pair of rollers to various positions. Disadvantages are cost, the ease of switching between the deployed and retracted positions, and the relatively small distance between the second pair of rollers with respect to the distance between the first pair of rollers.

There remains a need for a low cost, user-friendly, compact, wheel-mounted suitcase that has superior maneuvering around barriers, in which the weight of the suitcase is entirely supported by the wheels of the case when in a pulling/pushing position.

SUMMARY OF THE INVENTION

This invention provides a rollable apparatus having alternately retractable and deployable rollers that cooperate with other rollers to support the weight of the apparatus when it is in a rolling position. When the rollable apparatus is in an at-rest, or upright, position, preferably none of the weight of such apparatus is supported by the retractable rollers and the weight is at least partially supported by the other rollers.

A holder apparatus includes first panel means having a top portion and a bottom portion, and a second panel means connected to the bottom portion of the first panel means, with at least one of the first and second panel means having a rigid body portion to provide support therefor. A first roller means is mounted about adjacent to the bottom portion of the second panel means and is positioned to at least partially support the holder apparatus when in a generally upright position and to enable rolling movement of the holder apparatus across a surface when in an inclined position. The first end of an arm means is pivotally mounted to the rigid body portion. A second roller means is mounted about adjacent to the second end of the arm means and is positioned to enable rolling movement of the holder apparatus across the surface. A bracket means is connected between the rigid body portion and the arm means at a position different from the first end of the arm means. The bracket means is movable between a deployed position in which the arm means is locked at an angle to the rigid body portion, and a retracted position in which the arm means is in juxtaposition to the rigid body portion. The first and second roller means cooperate to fully support the holder apparatus when the bracket means is in the deployed position. A handle means is mounted about adjacent to the rigid body portion for effecting rolling movement of the holder apparatus across the surface.

A number of preferred refinements include the arm means may be provided with an opening, and first and second link means of the bracket means may be generally within the opening in the retracted position. The arm means and the first and second link means may be generally parallel to the rigid body portion in the retracted position.

As another aspect of the invention, a container includes generally parallel spaced apart front and rear panels connected about their peripheries to a wall member. The wall member, which has a top portion and a bottom portion positioned opposite one another, extends between the front and rear panels, thereby defining a volume. At least one of the rear panel, the front panel and the wall member have a rigid body portion to provide support therefor. A first roller means is mounted about adjacent to the bottom portion of the wall member and is positioned to at least partially support the container when in a generally upright position and to enable rolling movement of the container across a surface when in an inclined position. The first end of an arm means is pivotally mounted to the rigid body portion. A second roller means is mounted about adjacent to the second end of the arm means and is positioned to enable rolling movement of the container across the surface. A first link means is pivotally mounted to the rigid body portion, and a second link means is pivotally mounted to the first link means and the arm means. The arm means is alternately retractable to a retracted position about adjacent to the rear panel, and deployable to a deployed position spaced outwardly from the rear panel. The first and second roller means cooperate to fully support the container when the second roller means is deployed and the container is in a rolling position. A handle means is mounted about adjacent to the rigid body portion for effecting rolling movement of the container across the surface.

One of the first and second link means may be provided with pivot means for pivotally mounting the first and second link means; the first and second link means may include a common plane in the deployed position; and the pivot means may include a pivot line which is offset from the common plane of the first and second link means in the deployed position.

The arm means may be provided with means for engagement by a user for movement from the retracted position to the deployed position. The means for engagement may include receptacle means for engagement by a user's foot.

As a further aspect of the invention, a cart includes a first panel having a top portion and a bottom portion, and a second panel connected to the bottom portion of the first panel. A first roller means is mounted about adjacent to the second panel and is positioned to at least partially support the cart when in a generally upright position and to enable rolling movement of the cart across a surface when in an inclined position. The first end of an arm means is pivotally mounted to the first panel. A second roller means is mounted about adjacent to the second end of the arm means and is positioned to enable rolling movement of the cart across the surface. A first link means is pivotally mounted to the first panel, and a second link means is pivotally mounted to the first link means and the arm means. The arm means is alternately retractable to a retracted position about adjacent to the first panel, and deployable to a deployed position spaced outwardly from the first panel. The first and second roller means cooperate to fully support the cart when the second roller means is deployed and the cart is in a rolling position. A handle means is mounted about adjacent to the rigid body portion for effecting rolling movement of the cart across the surface.

As a still further aspect of the invention, a roller apparatus for use with a holder device, which has a first panel, a second panel connected to the bottom portion of the first panel, and handle means for effecting rolling movement of the holder device across a surface, includes a first roller means mounted about adjacent to the second panel of the holder device. The first roller means is positioned to at least partially support the holder device when in a generally upright position and to enable rolling movement of the holder device across the surface when in an inclined position. The first end of an arm means is pivotally mounted to the first panel. A second roller means is mounted about adjacent to the second end of the arm means and is positioned to enable rolling movement of the holder device across the surface. A first link means is pivotally mounted to the first panel, and a second link means is pivotally mounted to the first link means and the arm means. The arm means is alternately retractable to a retracted position about adjacent to the first panel, and deployable to a deployed position spaced outwardly from the first panel. The first and second roller means cooperate to fully support the holder device when the second roller means is deployed and the holder device is in a rolling position.

Other details, objects, and advantages of the invention will become more apparent as the following description of a present preferred embodiment thereof proceeds.

BRIEF DESCRIPTION OF THE DRAWINGS

In the accompanying drawings, a present preferred embodiment of the invention is illustrated in which.

DESCRIPTION OF A PREFERRED EMBODIMENT

As employed herein, the term "container" is intended to include, but shall not be limited to, luggage, case, suitcase, and a wide range of other devices for holding objects within a volume.

As employed herein, the term "cart" is intended to include, but shall not be limited to, trolley, dolly, luggage cart, golf cart, shopping cart, baby stroller, baby carriage and a wide range of other devices for movably holding objects or small persons.

As employed herein, the term "holder apparatus" is intended to include, but shall not be limited to, container and cart.

Figure 1:
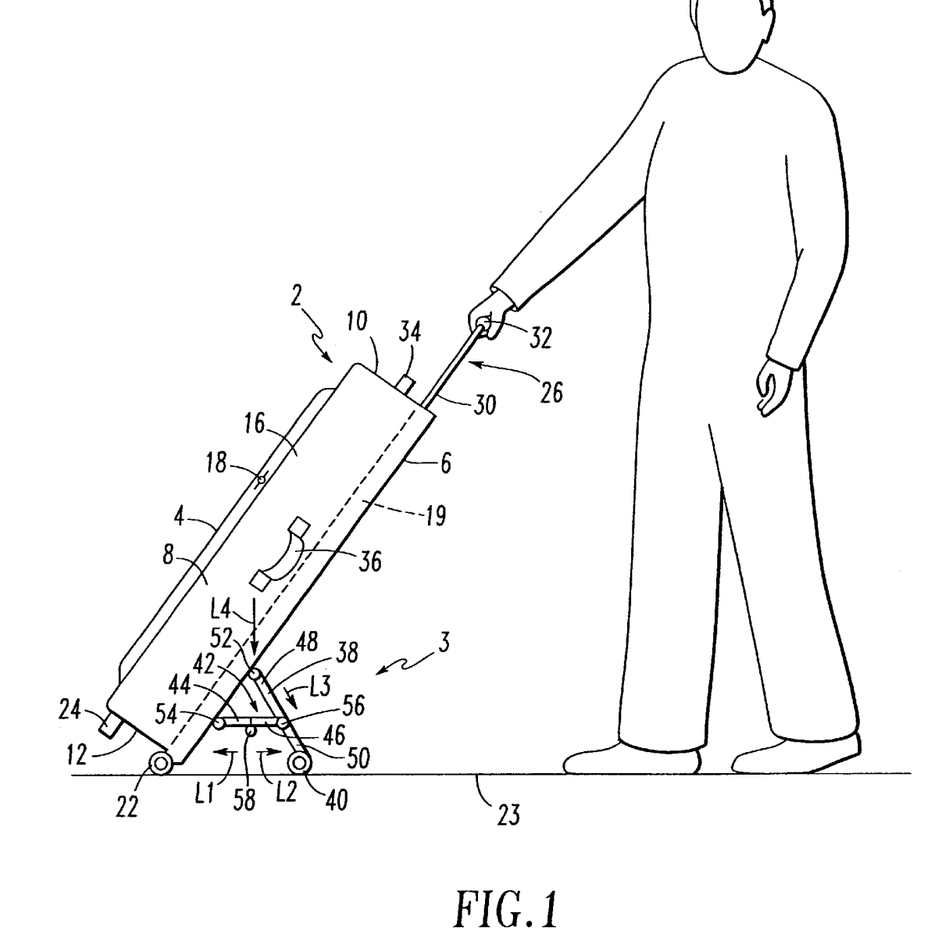
FIG. 1 is a side elevational view of an embodiment of the suitcase and roller mechanism of this invention being moved by a user.

FIG. 1 illustrates a preferred embodiment of a suitcase 2 including a roller mechanism 3. The suitcase 2 also includes generally parallel spaced apart front and rear panels 4 and 6, respectively. The panels 4,6 are connected about their peripheries to a wall member 8. The wall member 8 extends between the panels 4,6, thereby defining a volume. The wall member 8 has a top portion 10, a bottom portion 12 positioned opposite the top portion 10, and side portions 14 (shown in FIG. 2) and 16. The panels 4,6 and wall member 8 are preferably made of soft, flexible material, such as fabric. A glide fastener 18, or zipper, may be provided on the periphery of the front panel 4 for opening and closing the suitcase 2 to permit access to the volume within the suitcase 2, although any suitable closure known to those skilled in the art may be provided. The rear panel 6 includes a rigid portion 19 (shown in hidden line drawing) which is preferably made of a thermoplastic material, although any suitably rigid material may be employed.

Figures 2, 3, 4:
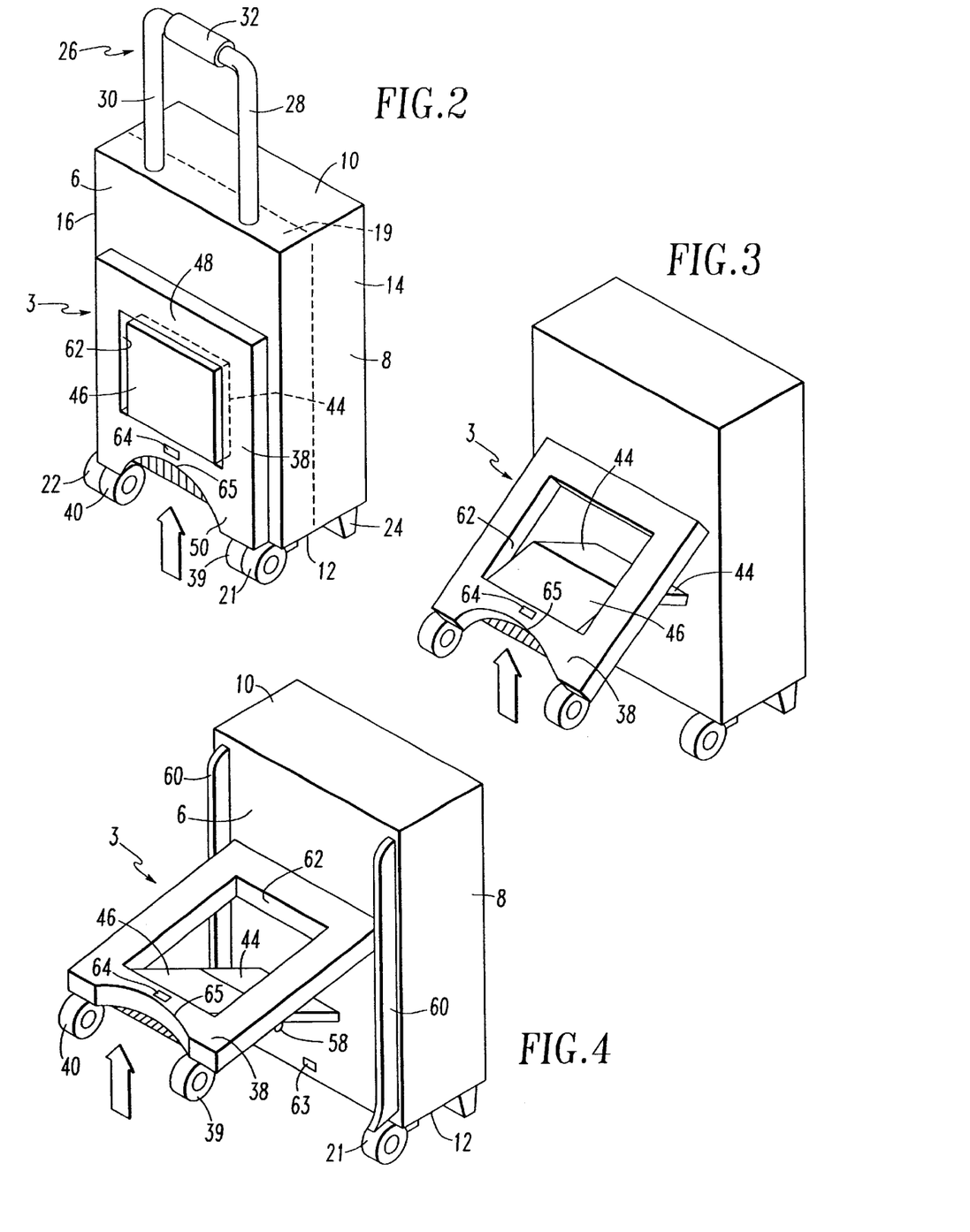
FIG. 2 is an isometric view of the suitcase and roller mechanism of FIG. 1 with the roller mechanism in a retracted position.
FIG. 3 is an isometric view of the suitcase and roller mechanism of FIG. 1 with the roller mechanism in a position intermediate the retracted position and a deployed position.
FIG. 4 is an isometric view of the suitcase and roller mechanism of FIG. 1 with the roller mechanism in the deployed position.

Also referring to FIG. 2, first rollers 21,22, which engage the rigid body portion 19 for support, are mounted about adjacent to the bottom portion 12 of wall member 8. The rollers 21,22 are preferably positioned at the junction of rear panel 6 and the bottom 12 of wall member 8. The rollers 21,22 are positioned to at least partially support the weight of the suitcase 2 when in the upright, or at-rest, position. In a preferred embodiment, legs 24 are provided on the front portion of the bottom 12 of wall member 8 to support the remainder of the weight of the suitcase 2 when in the upright position. The rollers 21,22 are operable to enable rolling movement of the suitcase 2 across a surface 23 when in an inclined position. When the roller mechanism 3 is not deployed, the weight of the suitcase 2 is preferably divided between the rollers 21,22 and a push/pull handle 26. As discussed below in connection with FIG. 12, the rollers of the arm 38 are preferably apart from the surface 23 when the associated container or cart (not shown) is in the upright position.

The push/pull handle 26 is preferably a rigid handle having two legs 28,30 and a gripping member 32. The handle 26 is mounted on the suitcase 2 about adjacent to the rigid body portion 19 at the top portion 10 of wall member 8. The handle 26 is alternately retractable into and extendable out of the volume of the suitcase 2. To enable retraction and extension, the handle 26 preferably includes an extension portion and a carrier (not shown) supported by the rigid portion 19 (shown in hidden line drawing). The carrier may include a pair of tubes (not shown) to telescopically receive the legs 28,30 therein for retraction. Such a retraction and extension structure is known to those skilled in the art. The handle 26, which preferably also includes a locking mechanism (not shown) for locking the handle 26 in the retracted and one or more extended positions, may be employed by the user to effect rolling movement of the suitcase 2 across the surface 23. The various positions, and the retractability and extendibility of the push/pull handle 26, permit the suitcase 2 to be moved by users of various heights.

The suitcase 2 may include one or more carry handles mounted on one or more surfaces thereof, such as carry handle 34 mounted on the top 10 and/or carry handle 36 mounted on the side 16 of wall member 8. The carry handles 34,36 may be employed by the user to grasp the suitcase 2 and lift it, thereby supporting the entire weight thereof. The carry handles 34,36 may be of any type known to those skilled in the art. Preferably, to permit either of the carry handles 34,36 to fully support the weight of the suitcase 2 and its contents, the top 10 and side 16 of wall member 8 are rigid.

The roller mechanism 3 includes an arm 38; second rollers 39,40; and a bracket mechanism 42 having a pair of links 44,46. The arm 38 has a first end 48 a second end 50. The first end 48 of the arm 38 is pivotally mounted to the rigid body portion 19 by a suitable pivot mechanism, such as hinge 52. The second rollers 39,40 are mounted about adjacent to the second end 50 of the arm 38 and are positioned to enable rolling movement of the suitcase 2 across the surface 23. The first link 44 is pivotally mounted to the rigid body portion 19 by a suitable pivot mechanism, such as hinge 54. The second link 46 is pivotally mounted to the arm 38 and to the first link 44 by suitable pivot mechanisms, such as hinges 56 and 58, respectively. In this manner, the bracket mechanism 42 is connected between: (1) the rigid body portion 19 by hinge 54; and (2) the arm 38 by hinge 56. The hinge 58 pivotally mounts the first link 44 to the second link 46.

The bracket mechanism 42 is movable between a deployed position (as shown in FIGS. 1 and 4) in which the arm 38 is locked at an angle to the rigid body portion 19, and a retracted position (as shown in FIG. 2) in which the arm 38 is in juxtaposition to the rigid body portion 19. Similarly, the arm 38 is alternately retractable to a retracted position (as shown in FIG. 2) about adjacent to the rear panel 6, and deployable to a deployed position (as shown in FIGS. 1 and 4) spaced outwardly from the rear panel 6. In the deployed position of FIGS. 1 and 4, the first rollers 21,22 and the second rollers 39,40 cooperate to fully support the suitcase 2 when the second rollers 39,40 are deployed and the suitcase is in a rolling position (as shown in FIG. 1). Because the weight of the suitcase 2 is fully supported (as shown in FIG. 1) by the rollers 21,22 and 39,40, the user does not have to provide any support, such as a balancing force, therefor. Accordingly, even a child could push or pull the suitcase 2.

The rollers 21,22,39,40 may be any wheel or caster of a type known to those skilled in the art. The second rollers 39,40 are preferably mounted to permit swivel movement thereof with respect to the arm 38 and, hence, may have two rotational axes which permit rolling movement of the suitcase 2 on the surface 23 of FIG. 1 in a straight and/or curved path. The distance between the side portions 14,16 is about the same as the distance between the first rollers 21,22. Preferably, in terms of improving the stability of the suitcase 2, the distance between the second rollers 39,40 is substantially the same as the distance between the first rollers 21,22 and, hence, is substantially the same as the distance between the side portions 14,16.

As shown in FIG. 4, the rear panel 6 has a pair of scuff or skid bars 60 secured thereto. The skid bars 60 extend generally parallel to the pull handle 26 (shown in FIG. 2) and are positioned between the top portion 10 and bottom portion 12 of wall member 8. In a preferred embodiment, the longitudinal axes of the skid bars 60 are aligned with the rollers 21,22. The skid bars 60, which are preferably made of rigid thermoplastic, may be used to assist in sliding the suitcase 2 vertically from one level to another, such as up stairs or from the floor onto a bed. The skid bars 60 present a smaller surface to the edge of a step than does the rear panel 6 and, also, have a lower coefficient of friction than does the fabric from which rear panel 6 is preferably made. Accordingly, there is less resistance to sliding movement when skid bars 60 are employed. The roller mechanism 3 preferably is compact in the retracted position of FIG. 2. This large flat area of the retracted roller mechanism 3 is protected by the vertical skid bars 60 which substantially run the length of the suitcase 2.

Referring to FIGS. 2–4 and 18, the arm 38 has an opening 62. In the retracted position of FIGS. 2 and 18, the pair of links 44,46 is generally within the opening 62 of the arm 38. As shown in FIG. 2, the arm 38 and the links 44,46 are preferably parallel to the rigid body portion 19 in the retracted position. As shown in FIG. 4, in the deployed position, the links 44,46 form a substantially common plane with the pivot line of the hinge 58 being parallel to the common plane. The pivot line of the hinge 58 is offset from the common plane of the links 44,46 in the deployed position. In the position, shown in FIG. 3, intermediate the retracted and deployed positions, the hinge 58 facilitates the movement of the links 44,46 from the parallel position of FIGS. 2 and 18 to the substantially coplanar, deployed position of FIG. 4. As shown in FIG. 4, the rear panel 6 preferably has a latch 63 for latching a corresponding latch portion 64 of the arm 38. The latch 63 alternately latches the arm 38 to the rear panel 6 in the retracted position of FIG. 2, and unlatches the arm 38 from the rear panel 6 to enter the intermediate position of FIG. 3 and, hence, the deployed position of FIG. 4. The purpose of the latch 63 is to keep the roller mechanism 3 in the closed or retracted position. Preferably, the latch 63 is recessed within the corresponding latch portion 64 of the arm 38 in the retracted position.

In the retracted or collapsed position of FIG. 2, the roller mechanism 3 is preferably flush and flat with respect to the suitcase 2, with no protrusions, latches, or lugs to foul or catch. The roller mechanism 3 acts as a belly pan to protect the rear panel 6, thereby providing additional protection to the suitcase 2 and its contents.

Figure 12:
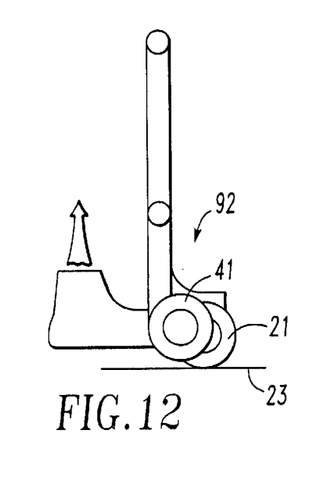
FIGS. 12–14 are simplified side elevational views of deployment of another embodiment of the roller mechanism of the invention from the retracted, to the intermediate, and to the deployed positions, respectively.
Figure 13:
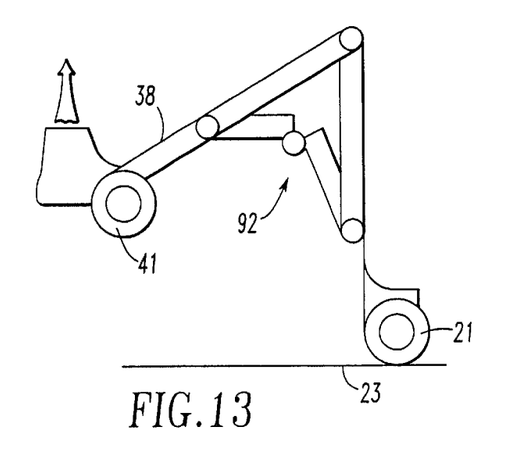
Figure 14:
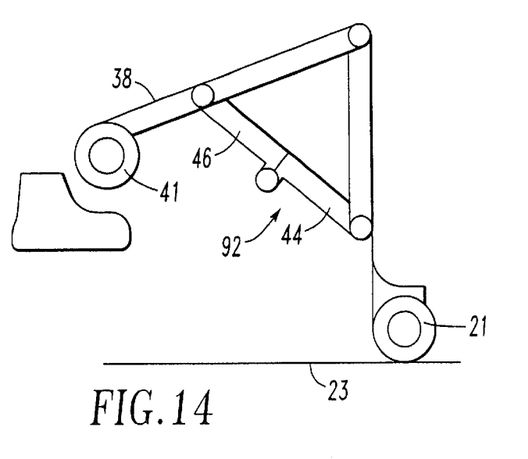
Figure 16:
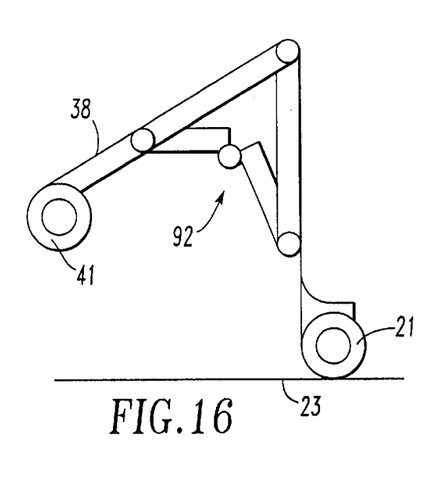
Figure 17:
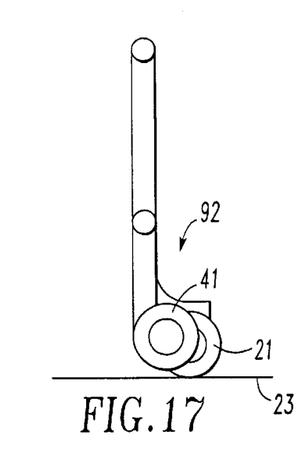

The bottom 65 of the arm 38 of the roller mechanism 3 is preferably arched to reflect access from the toe of a shoe. The arched bottom receptacle 65, as discussed in greater detail below in connection with FIGS. 12–14, is engaged by the user's foot, for movement from the retracted position to the deployed position. After releasing the latch 63, the user pulls up on the arm 38 until it automatically locks into the deployed position of FIG. 4. FIG. 4 illustrates the roller mechanism 3 almost ready for use. In the deployed or most extended position of the roller mechanism 3, the two links 44,46 have dropped down from the opening 62 and locked into place. The roller mechanism 3 is locked and will remain in this position until unlocked by the user as discussed below in connection with FIGS. 15–17.

Referring again to FIG. 1, the roller mechanism 3 is ready for use. The suitcase 2 has been tipped over until all four rollers 21,22,39,40 (rollers 21 and 39 are shown in FIG. 4) are on the surface 23. The static loads L1,L2,L3 on the roller mechanism 3 are illustrated with a weighted container, such as the suitcase 2. The geometry employed directs the loads L1,L2 parallel to the links 44,46 in either compression or tension. The arm 38 is in compression by the load L3. The load L3 directed through the arm 38 is preferably as straight as possible. The two links 44,46 are, in this example, in tension for maximum strength.

Figure 5:
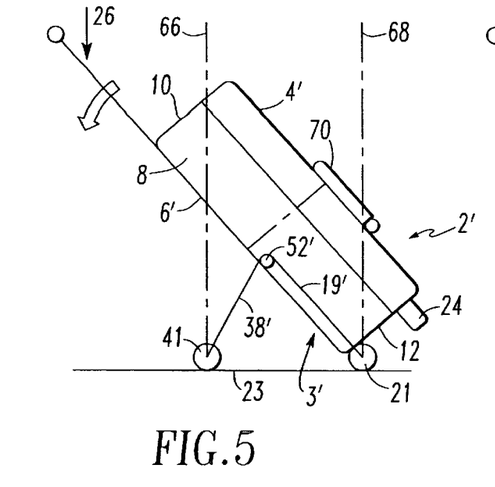
FIG. 5 is a simplified side elevational view of another embodiment of the roller mechanism and suitcase, which has a shelf in a retracted position, of the invention.
Figure 6:
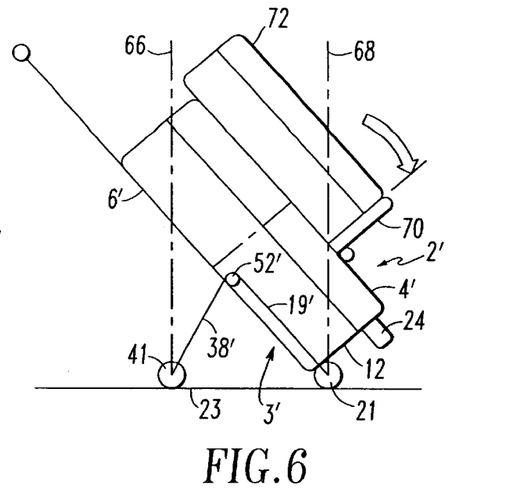
FIG. 6 is a simplified side elevational view of the roller mechanism and suitcase of FIG. 5 with the shelf in a deployed position.

FIGS. 5–6 are simplified side elevational views of another embodiment of a suitcase 2' and a roller mechanism 3'. Except as discussed below, the suitcase 2' and roller mechanism 3' are substantially the same as the respective suitcase 2 and roller mechanism 3 of FIGS. 1–4 (for convenience of illustration, only part of the roller mechanism 3' is illustrated). The suitcase 2' is tipped over to a rolling position having an exemplary angle from the horizontal position of about 50 to 60 degrees. In other words, the suitcase 2' is tipped over to a rolling position having an angle from the vertical or upright position of about 30 to 40 degrees. The suitcase includes the pair of first rollers 21,22 (only roller 21 is shown). The roller mechanism 3' includes an arm 38', similar to the arm 38 of FIG. 2, which has a single roller 41. The rear panel 6' has an internal rigid body portion 19'. The end of the arm 38' is pivotally mounted to the rigid body portion 19' by a hinge 52'.

The center of balance of the suitcase 2', like the suitcase 2 of FIG. 1, and most of the mass, are between the roller centerlines 66,68. In this manner, the suitcase 2' may be pulled forward (to the left of FIG. 5) without tipping forward. Furthermore, because the mass is centralized by the angle of tip, the deployed position of the roller mechanism 3', like the roller mechanism 3 of FIG. 1, provides a relatively stable condition, regardless whether the suitcases 2,2' are empty, full, or full with the contents thereof either bottom heavy or top heavy. This stable condition accommodates for rough ground, potholes, inclines, and declines in the surface 23, as well as acceleration, deceleration, and being inadvertently hit in various directions by the user and/or the surface 23. Moreover, the suitcases 2,2' are free to be rolled, by pushing and/or pulling, without any additional static load on the user.

The suitcase 2' includes a front panel 4', which preferably has a rigid portion, and a fold-out shelf member 70. The shelf member 70 is pivotally mounted to the front panel 4' between the bottom portion 12 and the top portion 10 of wall member 8. The shelf member 70 is pivotable between a retracted position (shown in FIG. 5) about adjacent the front panel 4' and a deployed position (shown in FIG. 6) which forms a shelf on the front panel 4'. The shelf supports an object, such as exemplary suitcase 72, another case, or any excess materials, substantially within the center of balance of the suitcase 2', between the roller centerlines 66,68.

Figure 7:
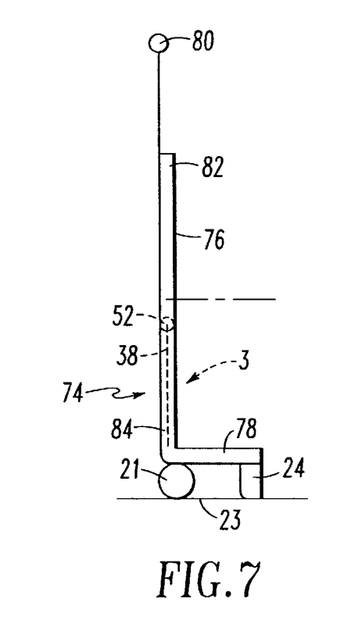
FIG. 7 is a side elevational view of an embodiment of the cart of the invention having the roller mechanism in an upright position.
Figure 8:
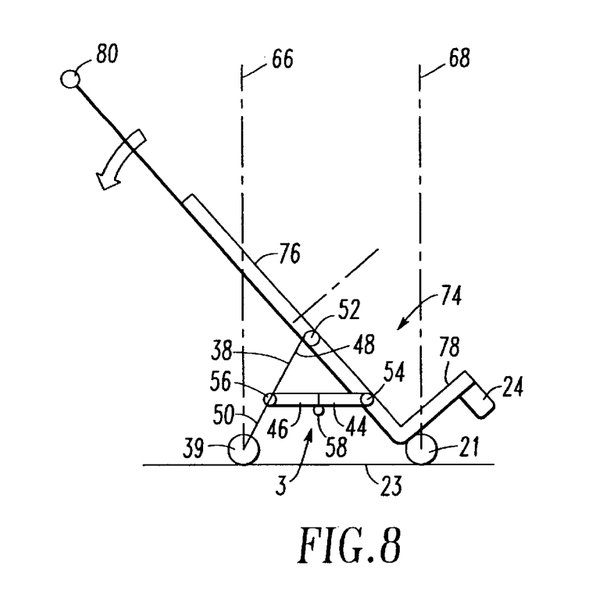
FIG. 8 is a side elevational view of the cart of FIG. 7 with the roller mechanism in a rolling position.

Referring to FIGS. 7 and 8, a cart 74 employing the roller mechanism 3 of FIGS. 1–4 (for convenience of illustration, only part of the roller mechanism 3 is illustrated) is illustrated in an upright position and a rolling position, respectively. The cart 74 includes a pair of rigid panels 76,78 and a handle 80. The first panel 76 has a top portion 82 and a bottom portion 84. The second panel 78 is connected to the bottom portion 84 of the first panel 76. A pair of first rollers 21 (only one roller is shown) is mounted about adjacent to the second panel 78 and is positioned to at least partially support the cart 74 when in the upright position and to enable rolling movement of the cart 74 across the surface 23 when in the inclined position. The end 48 of the arm 38 is pivotally mounted to the first panel 76 by the hinge 52. Similarly, one end of the link 44 is pivotally mounted to the first panel 76 by the hinge 54. A pair of second rollers 39 (only one is shown) is mounted about adjacent to the second end 50 of the arm 38 and is positioned to enable rolling movement of the cart 74 across the surface 23. In a similar manner as discussed above in connection with FIGS. 1–4, the arm 38 is alternately retractable to the retracted position of FIG. 7 adjacent to the first panel 76, and is deployable to the deployed position (shown in FIG. 8) spaced outwardly from the first panel 76. In this position, the first and second rollers 21,39 cooperate to fully support the cart 74 in the rolling position thereof. The handle 80 is mounted on the cart 74 about adjacent to the top portion 82 of the first rigid panel 76. The user employs the handle 80 to effect rolling movement, either by pushing or pulling the cart 74 across the surface 23.

Figure 9:
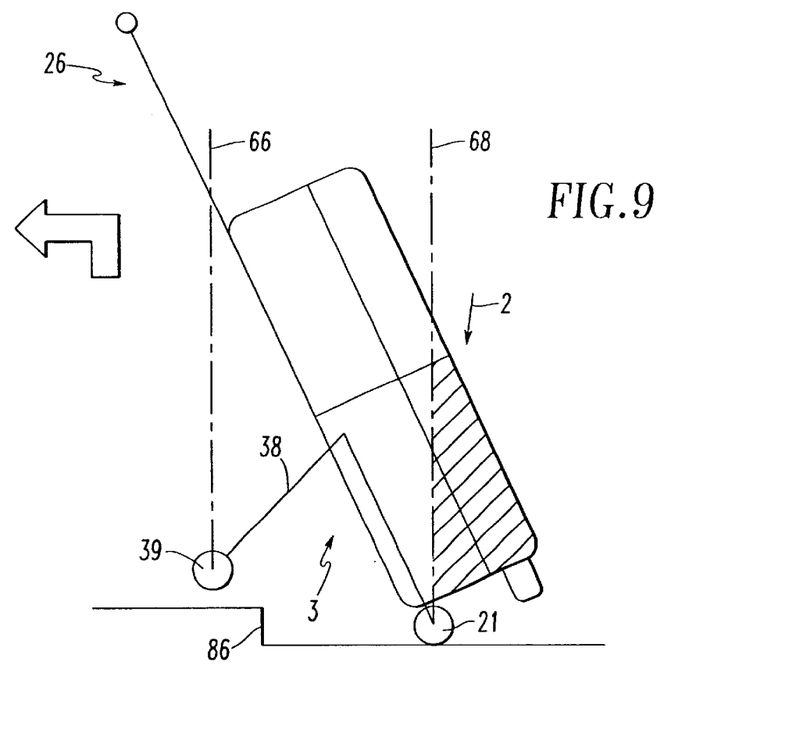
FIG. 9 is a simplified side elevational view of the suitcase and roller mechanism of FIG. 1 being pulled across a relatively small step.
Figure 10:
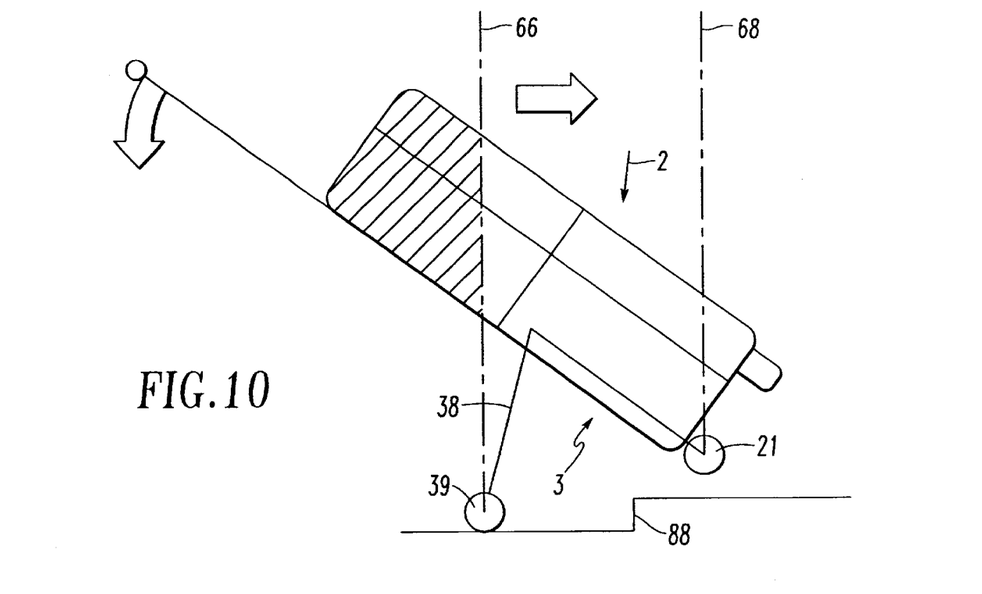
FIG. 10 is a simplified side elevational view of the suitcase and roller mechanism of FIG. 1 being pushed across a relatively small step.
Figure 11:
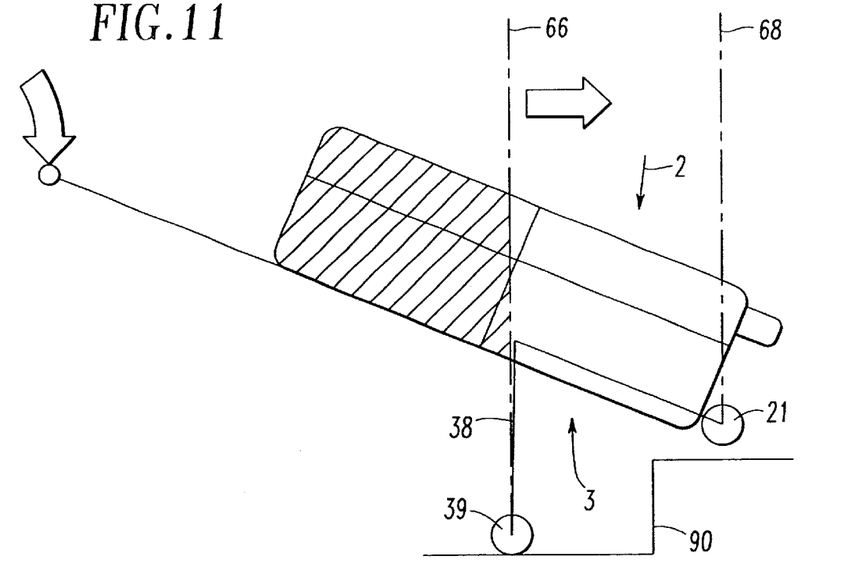
FIG. 11 is a simplified side elevational view of the suitcase and roller mechanism of FIG. 1 being pushed across a relative large step.

Referring to FIGS. 9–11, with the option of both pulling and pushing, the unique and stable balance of the roller mechanism 3, as provided by the triangulated centralization of mass, allows the exemplary suitcase 2 to be negotiated over obstacles, such as curbs 86 and 88, in the pulling and pushing conditions, respectively. The centralization of mass is displaced exponentially as the exemplary suitcase 2 is increasingly tipped over. For ground inclines and declines, the center of mass is generally constant, thereby providing suitable stability.

The two steps 86 and 88 are shown on either side of the rollers 39,21 in FIGS. 9 and 10, respectively. Also referring to FIG. 1, if the roller mechanism 3 is pushed over a step, smaller than the step 88 of FIG. 10, the loads are very similar to the static loads L1,L2,L3. The arm 38 is in compression and the links 44,46 are in tension. If, however, the roller mechanism 3 is pulled over a step, which is about no higher than the horizontal centerline of the roller 39 and smaller than the step 86 of FIG. 9, then a different set of loads are imposed on the roller mechanism 3. The offset pivot line of the hinge 58 connecting the links 44,46 directs the loads at a mild offset to the links 44,46. The links 44,46 are subjected to compression because such pivot line dictates an over-center or offset condition. The links 44,46 do not return to the partially retracted position (shown in FIG. 3). Instead, the links 44,46 are compressed, thereby effecting a temporary (for as long as the load from the small step is applied), unitary and relatively strong single link, which has sufficient strength to allow the roller mechanism 3 to traverse the small step.

As shown in FIG. 9, the step 86 is higher than the horizontal centerline of the roller 39. In this case, the roller mechanism 3 cannot simply be bumped over the step 86 and, instead, must be lifted by the handle 26 over the step 86. In this condition, the links 44,46 preferably do not collapse or fold. The links 44,46 are subjected to compression by the pendulum effect of the weight of the roller 39 and the arm 38, and effect a unitary and relatively strong condition.

When the suitcase 2 is tipped over purposefully, as shown in FIG. 11, to negotiate a relatively large step 90, the mass moves exponentially outside (as shown for convenience of reference in cross hatch in FIGS. 9–11) the center of mass between the roller centerlines 66,68 and creates a counterbalance to ease or lessen the static downward load required by the user to negotiate the large step 90.

Referring again to FIG. 1, the links 44,46, shown in their over-center position, fold back to the partially retracted position (shown in FIG. 3) if upward pressure is applied to the offset center hinge 58 that connects the links 44,46. The links 44,46 return to their over-center position (shown in FIG. 1) once the upward load is relieved as long as static downward pressure, such as load L4 from the volume of the suitcase 2, has constantly been applied to the roller mechanism 3.

FIGS. 12–14 and 15–17 respectively illustrate: (1) the deployment; and (2) the closure or retraction of a roller mechanism 92. The second rollers 41 (only one roller is shown) are preferably apart from the surface 23 when the associated container or cart (not shown) is in the upright position of FIGS. 12 and 17. This obviates wear on the rollers 41 and the roller mechanism 92. Otherwise, the roller mechanism 92 is substantially the same as the roller mechanism 3 of FIGS. 1–4. Only one swift movement is required by the user to effect either the deployment or retraction condition. After the latch 63 of FIGS. 2–4 is unlatched, the user need not bend down as subsequent user operations may be effected with one foot only.

To deploy the roller mechanism 92, the user simply hooks his foot under the bottom arch 65 (shown in FIGS. 2–4) of the arm 38, which preferably is shaped specifically for the crown of a shoe, although hand deployment is possible. As shown in FIG. 13, the user pulls up on the arm 38 with his foot and then lifts up and over-centers the links 44,46. The user may then tip the roller mechanism 92, and the associated container or cart (not shown), onto the deployed rollers 21,41 for use.

Figure 15:
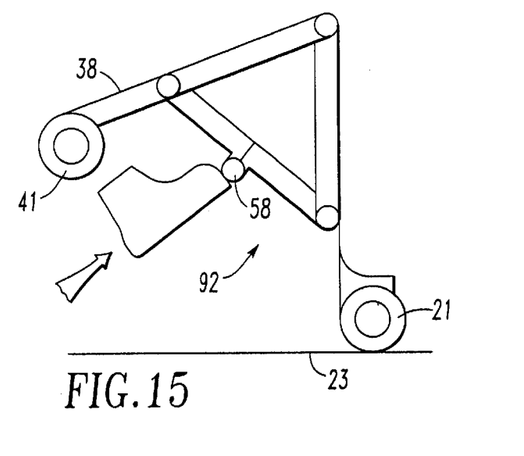
FIGS. 15–17 are simplified side elevational views of the retraction of the roller mechanism of FIGS. 12–14 from the deployed, to the intermediate, and to the retracted positions, respectively.

To close the roller mechanism 92, the roller mechanism 92, and the associated container or cart (not shown), is sat upright (as shown in FIG. 15) and a swift kick is preferably applied to the hinge 58. The weight and pendulum effect of the arm 38 and rollers 41 drops the roller mechanism 92 as sequentially shown in FIGS. 16 and 17.

Figure 18:
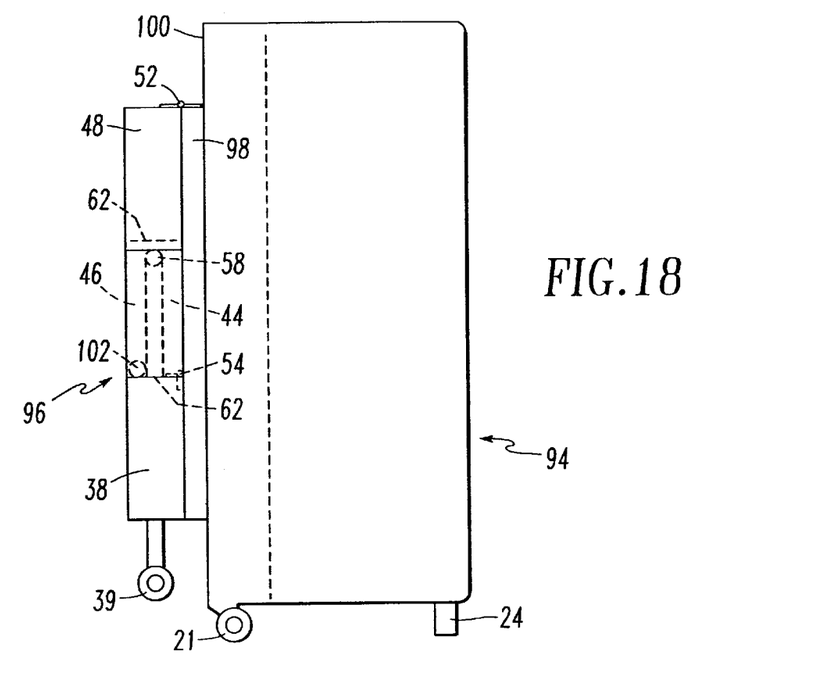
FIG. 18 is a side view of another embodiment of the suitcase and roller mechanism of the invention in the retracted position.

Referring to FIG. 18, another embodiment of a suitcase 94 and a roller mechanism 96 is illustrated. Except as discussed below, the suitcase 94 and roller mechanism 96 are substantially the same as the respective suitcase 2 and roller mechanism 3 of FIGS. 1–4. As discussed above in connection with FIGS. 1–4, the rear panel 6 of the suitcase 2 has the rigid body portion 19. The end 48 of the arm 38 includes the hinge 52 which pivotally mounts the arm 38 to the rigid body portion 19. The embodiment of FIGS. 1–4 is representative of the suitcase 2 incorporating the roller mechanism 3 at the time of manufacture.

FIG. 18 is representative of the suitcase 94 being retrofitted with the roller mechanism 96. When the roller mechanism 96 is installed as a retrofit, an external mounting panel 98 is also included. The mounting panel 98 is between the roller mechanism 96 and the rear panel 100 of the suitcase 94. If the suitcase 94 has a rigid rear panel 100, as shown in FIG. 18, the mounting panel 98 is suitably secured to the rear panel 100 with fasteners (not shown). On the other hand, if a suitcase has a non-rigid rear panel (not shown), such as a fabric panel, then the mounting panel 98 is suitably secured to a corresponding mounting panel (not shown) positioned within the volume of such suitcase.

As shown in FIG. 18, the end 48 of the arm 38 includes the hinge 52 which pivotally mounts the arm 38 to the external panel 98. The layered flat links 44,46 (shown in hidden line drawing) are positioned on top of each other within the opening 62 (shown in hidden line drawing) of the arm 38. Preferably, the links 44,46 and rear panel 100, as well as the arm 38 and rear panel 100, have minimal or no significant airspace therebetween, and provide a relatively sturdy closed or retracted roller mechanism 96. The first link 44 is pivotally mounted to the external panel 98 by a suitable pivot mechanism, such as the hinge 54 (shown in hidden line drawing). The second link 46 is pivotally mounted to the first link 44 and the arm 38 by any suitable pivot mechanism known to those skilled in the art (shown in hidden line drawing), such as hinge 58 and/or pivot pin 102, respectively. It will be appreciated by those skilled in the art that other equivalent roller mechanisms may be flush mounted integrally with a surface of a container or cart.

The construction of the exemplary roller mechanisms 3,3',92,96 yields benefits where such mechanisms are frequently transported by conveyor belts and the like. The construction suits preferably low cost production methods such as injection molding. Plastic materials may be employed including glass filled nylon, polyethylene, polypropelene, or other materials known to those skilled in the art. For industrial applications, steel tubing in a welded or bolted assembly may provide suitable alternatives. For very low cost applications, natural resources such as wood may be employed. The construction of FIGS. 2–4, in which the arm 38 and links 44,46 resemble panels, imparts excellent torsional stiffness for loads other than those specifically described herein. For example, heavy side loads may otherwise deform a relatively slender steel tube.

It will be appreciated that the invention provides a cart or container apparatus, such as a suitcase, with retractable rollers that support the entire weight of the apparatus in a rolling position as well as the superior maneuverability of an upright wheeled apparatus that rolls in an inclined position. In addition, the apparatus may be rolled, by pushing or pulling, across a surface on the roller mechanism.

The roller mechanism may either be manufactured as part of, or retrofitted into, a variety of containers or carts to facilitate the mobility thereof. Furthermore, a mobile cart may provide additional load carrying capacity beyond the carrying capacity of the volume of a container.

Whereas particular embodiments of the present invention have been described above for purposes of illustration, it will be appreciated by those skilled in the art that numerous variations in the details may be made without departing from the invention as described in the appended claims.

What is claimed is:

1. A holder apparatus comprising:

a first panel having a top portion and a bottom portion;

a second panel connected to the bottom portion of said first panel, said second panel having a bottom portion;

said first panel having a panel portion and a rigid body portion to provide support therefor;

first roller means mounted to the bottom portion of said second panel and positioned to at least partially support said holder apparatus when said holder apparatus is in a generally upright position and to enable rolling movement of said holder apparatus across a surface when said holder apparatus is in an inclined position;

an arm having a first end, an opening and a second end, the first end of said arm being pivotally mounted to said rigid body portion, said arm movable between a first position and a second position;

second roller means mounted to the second end of said arm and positioned to enable rolling movement of said holder apparatus across said surface;

bracket means for supporting said arm in said first position connected between said rigid body portion and said arm at a position different from the first end of said arm, said bracket means movable between a deployed position in which said arm is locked in said first position at an angle to said rigid body portion, and a retracted position in which said arm is in juxtaposition to said rigid body portion in said second position, said bracket means is generally within the opening of said arm in the retracted position, with said arm and said bracket means cooperating to form a generally continuous closed area within the opening of said arm, said generally continuous closed area being generally parallel to the panel portion of said first panel in the retracted position;

said first and second roller means cooperating to fully support said holder apparatus when said bracket means is in the deployed position; and handle means for effecting rolling movement of said holder apparatus across said surface.

2. A container comprising:

generally parallel spaced apart front and rear panels connected about their peripheries to a wall member, said wall member extending between said front and rear panels, thereby defining a volume, said wall member having a top portion and a bottom portion positioned opposite one another;

at least one of said rear panel, said front panel and said wall member having a rigid body portion to provide support therefor;

first roller means mounted to the bottom portion of said wall member and positioned to at least partially support said container when said container is in a generally upright position and to enable rolling movement of said container across a surface when said container is in an inclined position;

an arm having a first end, an opening and a second end, the first end of said arm being pivotally mounted to said rigid body portion;

second roller means mounted to the second end of said arm and positioned to enable rolling movement of said container across said surface;

a first link pivotally mounted to said rigid body portion;

a second link pivotally mounted to said first link and said arm;

said arm being alternately retractable to a retracted position adjacent to said rear panel, and deployable to a deployed position spaced outwardly from said rear panel, said second link is generally within the opening of said arm in the retracted position, with said arm and said second link forming a generally continuous closed area in juxtaposition to said rear panel in the retracted position;

said first and second roller means cooperating to fully support said container when said second roller means is deployed and said container is in a rolling position and is in said inclined position having an angle from said surface of about 50 to 60 degrees; and handle means for effecting rolling movement of said container across said surface.

3. A suitcase having a mass with a center of mass, said suitcase comprising:

generally parallel spaced apart front and rear panels connected about their peripheries to a wall member, said wall member extending between said front and rear panels, thereby defining a volume, said wall member having a top portion and a bottom portion positioned opposite one another;

at least one of said rear panel said front panel and said wall member having a rigid body portion to provide support therefor;

first roller means mounted to the bottom portion of said wall member and positioned to at least partially support said suitcase when said suitcase is in a generally upright position and to enable rolling movement of said suitcase across a surface when said suitcase is in an inclined position;

an arm having a first end and a second end, the first end of said arm being pivotally mounted to said rigid body portion;

second roller means mounted to the second end of said arm and positioned to enable rolling movement of said suitcase across said surface;

a first link pivotally mounted to said rigid body portion;

a second link pivotally mounted to said first link and said arm;

said arm being alternately retractable to a retracted position adjacent to said rear panel, and deployable to a deployed position spaced outwardly from said rear panel;

said first and second roller means cooperating to fully support said suitcase when said second roller means is deployed and said suitcase is in said inclined position having an angle from said surface of about 50 to 60 degrees, said angle being defined in a rotational direction, said arm positioned at an obtuse angle with respect to said surface, said obtuse angle being defined in said rotational direction, in order to provide support for said rigid body portion; and means for effecting rolling movement of said suitcase across said surfaces, with said first roller means defining a first roller centerline, with said second roller means defining a second roller centerline, and with a normal to said surface being centralized between said first and second roller centerlines and passing through said center of mass.

4. The suitcase of claim 3 wherein said suitcase is operable on said surface which includes a step; wherein said suitcase is operable for tipping to a position having an angle from said surface of less than said angle of about 50 to 60 degrees in order that said first roller means negotiates said step; and wherein said mass creates a counterbalance in order to lessen a static downward load required when operated for tipping to negotiate said step.

5. The suitcase of claim 3 wherein said suitcase is operable on said surface which includes a step; wherein said suitcase is operable for tipping to a position having an angle from said surface of greater than said angle of about 50 to 60 degrees in order that said second roller means negotiates said step; and wherein said mass creates a counterbalance in order to lessen a static upward load required when operated for tipping to negotiate said step.

6. A suitcase having a mass with a center of mass, said suitcase comprising:

generally parallel spaced apart front and rear panels connected about their peripheries to a wall member, said wall member extending between said front and rear panels, thereby defining a volume, said wall member having a top portion and a bottom portion positioned opposite one another;

at least one of said rear panel, said front panel and said wall member having a rigid body portion to provide support therefor;

first roller means mounted to the bottom portion of said wall member and positioned to at least partially support said suitcase when said suitcase is in a generally upright position and to enable rolling movement of said suitcase across a surface when said suitcase is in an inclined position;

an arm having a first end and a second end, the first end of said arm being pivotally mounted to said rigid body portion;

second roller means mounted to the second end of said arm and positioned to enable rolling movement of said suitcase across said surface;

said arm being alternately retractable to a retracted position adjacent to said rear panel, and deployable to a deployed position spaced outwardly from said rear panel;

means for supporting said arm in said deployed position;

said first and second roller means cooperating to fully support said suitcase when said second roller means is deployed and said suitcase is tipped over to a rolling position having an angle from an upright position, which is normal to said surface, of about 30 to 40 degrees, said angle being defined in a first rotational direction, said arm positioned at an obtuse angle with respect to said surface, said obtuse angle being defined in a second rotational direction which is opposite said first rotational direction, in order to provide support for said rigid body portion; and means for effecting rolling movement of said suitcase across said surface, with said first roller means defining a first roller centerline, with said second roller means defining a second roller centerline, and with a normal to said surface being centralized between said first and second roller centerlines and passing through said center of mass.

7. The suitcase of claim 6 wherein said suitcase is operable on said surface which includes a step; wherein said suitcase is operable for tipping to a position having an angle from said upright position of greater than said angle of about 30 to 40 degrees in order that said first roller means negotiates said step; and wherein said mass creates a counterbalance in order to lessen a static downward load required when operated for tipping to negotiate said step.

8. The suitcase of claim 6 wherein said suitcase is operable on said surface which includes a step; wherein said suitcase is operable for tipping to a position having an angle from said upright position of less than said angle of about 30 to 40 degrees in order that said second roller means negotiates said step; and wherein said mass creates a counterbalance in order to lessen a static upward load required when operated for tipping to negotiate said step.

9. The suitcase of claim 6 wherein said means supporting said arm includes a first link pivotally mounted to said rigid body portion, and a second link pivotally mounted to said first link and said arm.

* * * * *